United States Patent
Kong

(10) Patent No.: US 8,311,560 B2
(45) Date of Patent: Nov. 13, 2012

(54) METHOD OF CALLING A VEHICLE AND MOBILE TERMINAL FOR THE SAME

(75) Inventor: Jae Young Kong, Seoul (KR)

(73) Assignee: LG Electronics Inc., Seoul (KR)

( * ) Notice: Subject to any disclaimer, the term of this patent is extended or adjusted under 35 U.S.C. 154(b) by 379 days.

(21) Appl. No.: 12/691,665

(22) Filed: Jan. 21, 2010

(65) Prior Publication Data

US 2011/0009098 A1    Jan. 13, 2011

(30) Foreign Application Priority Data

Jul. 10, 2009    (KR) .................. 10-2009-0063025

(51) Int. Cl.
*H04W 24/00*    (2009.01)
(52) U.S. Cl. .................. 455/456.3; 455/456.1
(58) Field of Classification Search ..... 455/456.1–456.6
See application file for complete search history.

(56) References Cited

U.S. PATENT DOCUMENTS

| | | | |
|---|---|---|---|
| 2002/0034292 A1 | 3/2002 | Tuoriniemi et al. | |
| 2004/0219933 A1* | 11/2004 | Faith | 455/456.3 |
| 2005/0052462 A1* | 3/2005 | Sakamoto et al. | 345/473 |
| 2007/0103294 A1* | 5/2007 | Bonecutter et al. | 340/539.18 |

FOREIGN PATENT DOCUMENTS

| | | |
|---|---|---|
| EP | 1 418 557 A2 | 5/2004 |
| KR | 10-2001-0081077 A | 8/2001 |
| KR | 1020020062033 A | 7/2002 |
| KR | 1020020073650 A | 9/2002 |
| KR | 10-2008-0041921 A | 5/2008 |
| KR | 10-2009-0073742 A | 7/2009 |
| WO | WO 99/44186 A1 | 9/1999 |
| WO | WO 01/86492 A1 | 11/2001 |
| WO | WO 02/06994 A2 | 1/2002 |

OTHER PUBLICATIONS

European Search Report dated Oct. 18, 2010 issued in corresponding European Application No. 10002247.4.

* cited by examiner

*Primary Examiner* — Steven Lim
(74) *Attorney, Agent, or Firm* — Birch, Stewart, Kolasch & Birch, LLP

(57) ABSTRACT

A method of calling a vehicle and a mobile terminal for the same are discussed. According to an embodiment, the method includes: requesting vehicle information on each of at least one vehicle, which is located within a predetermined distance from a position of a mobile terminal and is available, from a vehicle calling server; receiving the requested vehicle information from the vehicle calling server; displaying, on a screen of the mobile terminal, a map on which a position of the mobile terminal and the vehicle information are indicated; when certain vehicle information is selected from the displayed map, generating by the mobile terminal a vehicle request for requesting a dispatch of a vehicle corresponding to the selected vehicle information; and transmitting by the mobile terminal the vehicle request to the vehicle calling server.

16 Claims, 10 Drawing Sheets

METHOD OF CALLING A VEHICLE AND MOBILE TERMINAL FOR THE SAME

This application claims the priority benefit of the Korean Patent Application No. 10-2009-0063025, filed on Jul. 10, 2009, which is hereby incorporated by reference as if fully set forth herein.

BACKGROUND OF THE INVENTION

1. Field of the Invention

The present invention relates to a method for allowing a user of a mobile terminal to call for a vacant or empty vehicle (e.g., a taxi) that is located within a predetermined distance from the user's mobile terminal, and the mobile terminal for implementing the method.

2. Discussion of the Related Art

In general, in order to allow a user or customer to use a vehicle calling service, the user must directly place a phone call to a center of the vehicle calling service, or must reserve a vehicle using a homepage or website provided by the vehicle calling center.

A plurality of vehicle drivers (e.g., a plurality of taxi drivers) have been registered as members in the vehicle calling center, such that the vehicle calling center can provide a user who calls for a vehicle with a suitable vehicle such as a taxi.

In more detail, the vehicle calling center records dispatch position information requested by the user, a phone number of the user, a user-requested arrival time, and the like, attempts to connect to a driver of the vehicle located closest to the user-requested dispatch position, and commands the driver to move or drive the vehicle to the dispatch-requested position so that the user can use the vehicle.

If the driver registered as a member in the vehicle calling center receives such a dispatch request signal from the vehicle calling center, then the driver directly places a phone call to the user so as to inform the user that the driver's vehicle is traveling to the dispatch position to pick up the user. After the driver's vehicle arrives at or near the dispatch position, the driver again has to make a phone call to the user so as to inform the user that the vehicle is at the location requested by the user and ready to pick up the user in need of the vehicle service. In this way, the conventional vehicle calling service has been used as described above.

However, the above-mentioned conventional vehicle calling service has a disadvantage in that the user who calls for a vehicle such as a taxi must remember a phone number of the vehicle calling center.

Further, in recent times, the number of crimes committed late at night by a few drivers who pick up women, elderly, handicapped, intoxicated passengers is rapidly increasing, such that many users or customers feel unsafe or unease about the use of the conventional vehicle calling service.

SUMMARY OF THE INVENTION

Accordingly, the present invention is directed to a method of calling a vehicle and a mobile terminal for the same that substantially obviate one or more problems due to limitations and disadvantages of the related art.

An object of the present invention is to provide a method for notifying a mobile terminal of information about the position of empty vehicles, each of which is located within a predetermined distance from the mobile terminal, information about the distance from the mobile terminal to each empty vehicle, and information about an estimated arrival time of each empty vehicle, and thus enabling the mobile terminal to request for a desired one of the empty vehicles by referring to the notified information, and the mobile terminal for implementing the vehicle calling method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of calling a vehicle includes requesting information of a vehicle, which is located within a predetermined distance from a position of a mobile terminal and has an empty seat, from a vehicle calling server, receiving the information of the vehicle, that is located within the predetermined distance and has the empty seat, from the vehicle calling server, displaying a map on which a position of the mobile terminal and the vehicle information are indicated, and generating a request signal for calling the vehicle when the vehicle information is selected on the map.

In another aspect of the present invention, a mobile terminal for calling a vehicle includes a position recognition unit configured to recognize a position of a mobile terminal, a radio frequency (RF) communication unit which transmits a request signal configured to request information of a vehicle, that is located within a predetermined distance from the position of the mobile terminal and has an empty seat, to a vehicle calling server, and receives vehicle information corresponding to the request signal from the vehicle calling server, a display configured to display a map on which the mobile terminal's position recognized by the position recognition unit and the vehicle information received from the RF communication unit are indicated, and a controller, if the vehicle information is selected on the map, configured to call a vehicle corresponding to the selected vehicle information.

In another aspect of the present invention, a method of calling a vehicle includes recognizing, by a vehicle calling server, position information of pre-registered vehicles, upon receipt of a request signal for requesting information of empty vehicles that are located within a predetermined distance from a position of an external mobile terminal, searching for a vehicle, that is located within a predetermined distance from the position of the mobile terminal and has an empty seat, in the position information of the pre-registered vehicles, transmitting vehicle information of the searched empty vehicle to the mobile terminal, upon receiving a request message for calling the searched vehicle from the mobile terminal, inquiring of the called vehicle about whether it can travel to the mobile terminal, and upon receiving an admission message indicating a dispatch available status from the called vehicle, informing the mobile terminal of a successful dispatch of the called vehicle.

In another aspect of the present invention, a method of calling a vehicle includes receiving, by a vehicle terminal, a dispatch inquiry signal including position information of a mobile terminal, displaying a map on which position information of the vehicle terminal and the position information of the mobile terminal are indicated, on a display screen, and if the position information of the mobile terminal is selected on the map, informing the mobile terminal of a successful dispatch status.

In another aspect, the present invention provides a method of calling a vehicle, the method comprising: requesting vehicle information on each of at least one vehicle, which is located within a predetermined distance from a position of a mobile terminal and is available, from a vehicle calling server; receiving the requested vehicle information from the vehicle calling server; displaying, on a screen of the mobile terminal, a map on which a position of the mobile terminal and the vehicle information are indicated; when certain vehicle information is selected from the displayed map, generating by the mobile terminal a vehicle request for requesting a dispatch of a vehicle corresponding to the selected vehicle information; and transmitting by the mobile terminal the vehicle request to the vehicle calling server.

In another aspect, the present invention provides a method of calling a vehicle, the method comprising: obtaining, by a vehicle calling server, position information of pre-registered vehicles, upon receipt of a request signal for requesting information on available vehicles that are located within a predetermined distance from a position of a mobile terminal; searching for at least one vehicle, that is located within a predetermined distance from the position of the mobile terminal and is available, in the position information of the pre-registered vehicles; transmitting vehicle information of the at least one searched vehicle to the mobile terminal; upon receiving a request message for requesting a dispatch of a certain vehicle among the at least one searched vehicle from the mobile terminal, inquiring about a current dispatch status of the requested certain vehicle with respect to the mobile terminal, from the requested certain vehicle; and upon receiving a message indicating the dispatch status from the requested certain vehicle, informing the mobile terminal of the received dispatch status.

In another aspect, the present invention provides a method of calling a vehicle, the method comprising: receiving, by a vehicle terminal in a vehicle, a dispatch inquiry including position information of a mobile terminal; displaying, on a screen provided in the vehicle terminal, a map on which position information of the vehicle terminal and the position information of the mobile terminal are indicated; and if the mobile terminal is selected on the map, informing the mobile terminal of a dispatch status of the vehicle.

In another aspect, the present invention provides a mobile terminal for requesting a vehicle, comprising: a position determining unit; a communication unit configured to communicate with a vehicle calling server; a display unit having a screen; and a controller, cooperating with the position determining unit, the communication unit, and the display unit, to: request vehicle information on each of at least one vehicle, which is located within a predetermined distance from a position of the mobile terminal and is available, from the vehicle calling server; receive the requested vehicle information from the vehicle calling server; display, on the screen, a map on which the position of the mobile terminal and the vehicle information are indicated; when certain vehicle information is selected from the displayed map, generate a vehicle request for requesting a dispatch of a vehicle corresponding to the selected vehicle information; and transmit the vehicle request to the vehicle calling server.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A vehicle calling method, a mobile terminal thereof, a vehicle calling server, and a terminal provided in a vehicle (also hereinafter referred to as a 'vehicle terminal') according to the present invention will hereinafter be described with reference to the accompanying drawings. The vehicle terminal is preferably a mobile terminal carried by a driver of the vehicle, and preferably is in the vehicle.

In the following description, a suffix "module" or "unit" contained in terms of constituent elements to be described will be selected or used together in consideration only of the convenience of writing the following specification, and the suffixes "module" and "unit" may do not necessarily have different meanings or roles.

In the following description, a term "mobile terminal" or "vehicle terminal" (also known as a mobile terminal provided in a vehicle) may include a mobile phone, a smart phone, a laptop computer, a personal digital assistant (PDA), a portable multimedia player (PMP), a navigation system, and the like.

Figure 1:
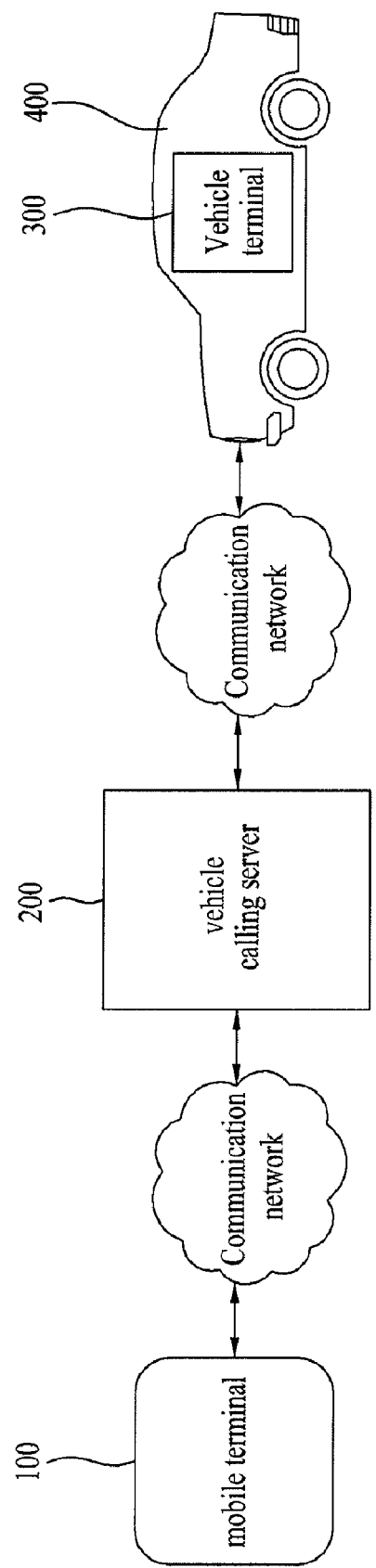
FIG. 1 is a diagram illustrating a system for a vehicle calling service according to an embodiment of the present invention.

FIG. 1 is a diagram illustrating a system for a vehicle calling service according to an embodiment of the present invention.

Referring to FIG. 1, a vehicle calling system according to an embodiment of the present invention includes a mobile terminal 100 for calling for (requesting for) a vehicle, a vehicle terminal 300 (terminal in a vehicle 400 such as a taxi, bus, etc.) located in the vehicle 400, and a vehicle calling server 300 for communicating with the mobile terminal 100 and the vehicle terminal 300, e.g., via networks, and searching for a vehicle, that is located within a predetermined distance from the current position of the mobile terminal 100 and is available (e.g., it has an empty seat or ready to pick up a customer), upon receiving a request for a vehicle from the mobile terminal 100, such that the vehicle calling server 300 can instruct the vehicle's driver, through the vehicle terminal 300, to move to or drive to the position of the mobile terminal 100 to pick up the user of the mobile terminal 100. The vehicle terminal 300 can be a mobile terminal carried by the driver of the vehicle 400 in the vehicle 400. All the components of the system are operatively coupled and configured.

The mobile terminal 100, the vehicle calling server 200, and the vehicle terminal 300 according to the present invention will hereinafter be described with reference to FIGS. 2 to 4.

Figure 2:
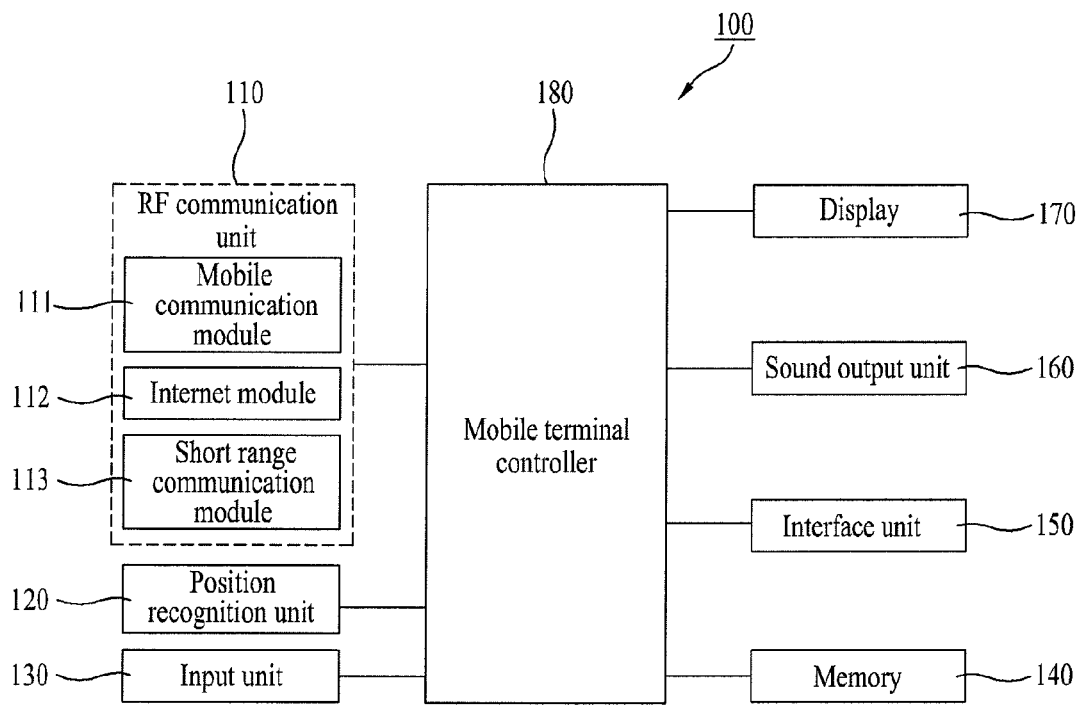
FIG. 2 is a block diagram illustrating a mobile terminal according to an embodiment of the present invention.

FIG. 2 is a block diagram illustrating a mobile terminal according to an embodiment of the present invention.

Referring to FIG. 2, the mobile terminal 100 may include a radio frequency (RF) communication unit 110, a position recognition unit or position determining/calculating unit 120, an input unit 130, a memory or storage 140, an interface unit 150, a sound output unit 160, a display 170, a mobile terminal controller 180, and the like.

Needless to say, it should be noted that it is possible to implement a different mobile terminal 100 having more or fewer constituent elements than those of FIG. 2 as needed.

The above-mentioned constituent elements will hereinafter be described in detail.

The RF communication unit 110 may include at least one communication module which implements either radio communication between one communication network including the mobile terminal 100 and the other communication network including the vehicle calling server 200 or radio communication between one communication network including the mobile terminal 100 and the other communication network including the vehicle terminal 300. For example, the RF communication unit 110 may include a mobile communication module 111, an Internet module 112, a short range communication module 113, and the like.

The mobile communication module 111 transmits and receives an RF signal to and from at least one of a base station, the vehicle calling server 200, and the vehicle terminal 300. The RF signal may include a voice/image call signal and an SMS (Short Message Service)/MMS (Multimedia Messaging Service) message that are used to call for a vehicle.

The Internet or network module 112 is used for implementing wireless Internet access, and transmits and receives the RF signal to and from either of the vehicle calling server 200 and the vehicle terminal 300 over the Internet or other network. The RF signal may include an E-mail for requesting a vehicle service therein. In this case, the Internet module 112 may be installed inside or outside of the mobile terminal 100. A variety of wireless Internet technologies can be used, for example, Wireless LAN (WNAN) (Wi-Fi), Wireless broadband (WiBro), World Interoperability for Microwave Access (WiMax), High Speed Downlink Packet Access (HSDPA), and the like. The short range communication module 113 is a module for implementing short range communication, and transmits/receives an RF signal to/from the vehicle calling server 200 and the vehicle terminal 300 over a short range communication network. In this case, a variety of short range communication technologies can be used, for example, Bluetooth, Radio Frequency Identification (RFID), Infrared Data Association (IrDA), Ultra Wideband (UWB), ZigBee, and the like.

The position recognition unit 120 serves as a Global Positioning System (GPS), such that it can recognize or obtain a current position or location of the mobile terminal 100.

The position recognition unit 120 receives data from three or more satellites, such that it calculates information about the distance from the mobile terminal to each satellite and information about accurate time information on the basis of the received data. Then, the position recognition unit 120 performs triangulation using the calculated information, such that it can correctly detect three-dimensional current position information of the mobile terminal 100 based on the latitude, longitude and altitude data.

Presently, a method for calculating position and time information of a mobile terminal using three satellites, and correcting an error of the calculated position and time information using still another satellite has been widely used. Also, the position recognition unit 120 continuously detects a current position of the mobile terminal 100 in real time, such that it can calculate speed information of the mobile terminal.

The position recognition unit 120 may also recognize the position of the mobile terminal 100 using not only the GPS but also base station (BS) position information.

The input unit 130 generates input data for allowing a user to control operations of the mobile terminal 100. The user of the mobile terminal 100 inputs commands and data to the mobile terminal through the input unit 130. The input unit 130 may be implemented as a key pad, a touchpad (including a static-pressure type and an electrostatic type), a jog wheel, a jog switch, and the like.

The memory 140 may store a program for operating the controller 180 of the mobile terminal 100 (hereinafter referred to as a mobile terminal controller 180), and may temporarily store input/output (I/O) data (e.g., broadcast programs, moving images, and the like).

The memory 140 stores map data. The mobile terminal controller 180 searches for a map corresponding to a region including a current position of the mobile terminal 100 obtained by the position recognition unit 120 in the stored map data, indicates the current position of the mobile terminal 100 on the searched map, and displays the resultant map including the indicated current position of the mobile terminal 100 on the display 170.

The memory 140 may include at least one of various storage units, for example, a flash memory, a hard disc, a multimedia card micro, a card type memory (e.g., SD or XD memory), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disc, and an optical disc.

The interface unit 150 is used as a path via which the mobile terminal 100 is connected to all external devices. The interface unit 150 receives data from the external devices, or receives a power source signal from the external devices, such that it transmits the received data and the power source signal to each constituent element contained in the mobile terminal 100, or transmits data stored in the mobile terminal 100 to the external devices.

For example, the interface unit 150 may include a wired/wireless headset port, an external power-supply port, a wired Internet connection port, a wired/wireless data port, a memory card port, a USB port, an audio I/O port, a video I/O port, an earphone port, and the like.

The sound output unit 160 may output audio data which has been received from the RF communication unit 110 or has been stored in the memory 140 during a call signal reception mode, a call connection mode, a recording mode, a voice recognition mode, a broadcast reception mode, and the like.

The sound output unit 160 may output sound signals related to functions (e.g., call signal reception sound, message reception sound, alert sound, input sound, etc.) carried out in the mobile terminal 100. The sound output unit 160 may include a receiver, a speaker, a buzzer, and the like.

The display 170 displays information processed by the mobile terminal 100. For example, if it is assumed that the mobile terminal 100 is in a vehicle calling mode, the display 170 may display a map that includes the current position of the mobile terminal 100 and information about or associated with available vehicles (e.g., empty vehicles) located within a predetermined distance from the mobile terminal 100. Here the predetermined distance can be set and varied by the mobile terminal 100, the vehicle calling server 200, or the vehicle terminal 300. The information about or associated with the available vehicle, which is displayed on the screen of the display 170, may also be referred to herein as vehicle information. The vehicle information can include, e.g., a position of a vehicle (e.g., indicated by a marker on the displayed map), other information associated with the vehicle (e.g., information about the vehicle itself such as the vehicle type and maker name, information (e.g., name, license info, etc.) about the driver of the vehicle, etc.}, etc.

The display 170 may include at least one of a liquid crystal display (LCD), a thin film transistor-liquid crystal display (TFT LCD), an organic light-emitting diode (OLED), a flexible display, and a three-dimensional (3D) display, etc.

If the display 170 and a sensor for sensing a touching action (hereinafter referred to as a touch sensor) are configured in the form of a layer, e.g., if the display 170 and the touch sensor are configured in the form of a touch screen, the display 170 may also be used as an input unit in addition to being used as the output unit. The touch sensor may be configured in the form of a touch film, a touch sheet, a touch pad, and the like.

The touch sensor detects the pressure applied to a specific part of the display 170 or a variation of electrostatic capacity generated from such a specific part of the display 170, and converts the detected pressure and the variation of electrostatic capacity into an electric input signal. The touch sensor may be configured to detect not only information about the position and region where the user touches, but also information about the pressure generated by the user's touching action.

If the user touches the touch sensor, signal(s) corresponding to the user's touching action are transferred to the touch controller. The touch controller processes the received signal(s), and transmits data corresponding to the received signal(s) to the mobile terminal controller 180. Therefore, the mobile terminal controller 180 can determine which region of the display 170 has been touched on the basis of the received data.

The mobile terminal controller 180 generally controls overall operations of the mobile terminal 100. For example, the mobile terminal controller 180 may perform not only a broadcast playback function, a data communication function, and a moving image playback function, but also a variety of control processes related to the vehicle calling operations of the present invention.

A variety of embodiments to be disclosed in the following description may be implemented in a computer or a computer-readable recording medium by means of software, hardware, or a combination thereof.

In case of implementing the present invention by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electric units for implementing other functions, etc. In some cases, embodiments of the present invention may also be implemented as the mobile terminal controller 180.

In case of implementing the present invention by software, embodiments having the same procedures and functions may be implemented with additional software modules. Each of the software modules may perform one or more functions and operations of the present invention. A software code may be implemented as a software application written in suitable programming languages. The software code may be stored in the memory 140, and may be carried out by the mobile terminal controller 180.

As described above, the constituent elements of the mobile terminal 100 have been described with reference to FIG. 2.

Next, the vehicle calling server 200 will hereinafter be described in detail with reference to FIG. 3.

Figure 3:
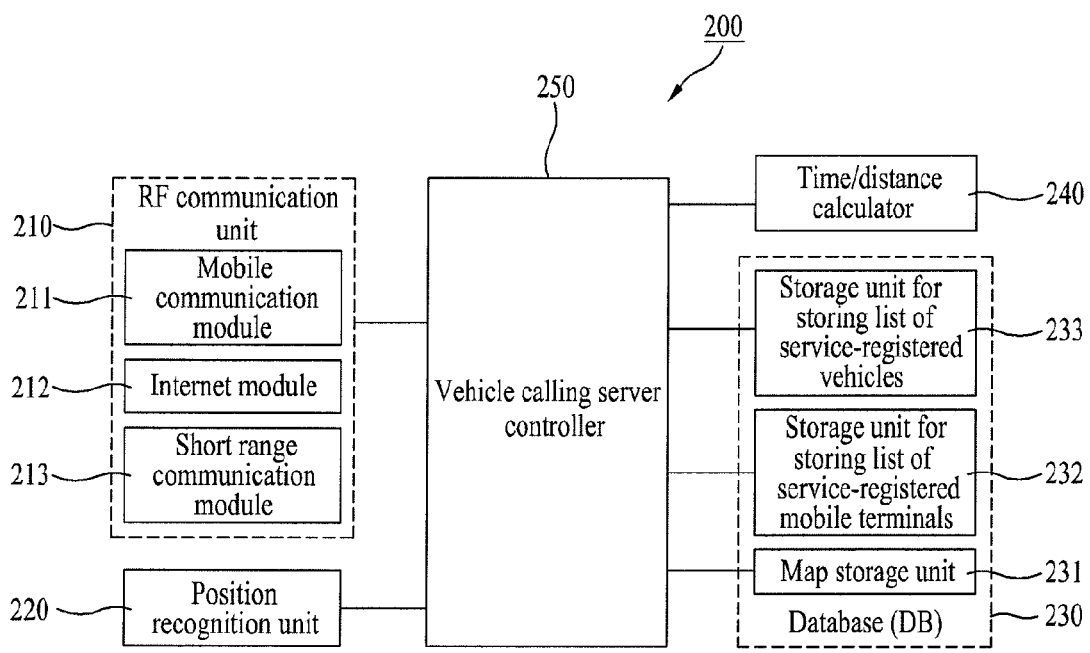
FIG. 3 is a block diagram illustrating a vehicle calling server according to an embodiment of the present invention.

FIG. 3 is a block diagram illustrating the vehicle calling server 200 according to an embodiment of the present invention.

Referring to FIG. 3, the vehicle calling server 200 may include an RF communication unit 210, a position recognition unit 220, a database (DB) 230, a time/distance calculator 240, a vehicle calling server controller 250, and the like.

Needless to say, it is possible to implement a different vehicle calling server 200 having more or fewer constituent elements than those of FIG. 3 as necessary.

The above-mentioned constituent elements will hereinafter be described in detail.

The RF communication unit 210 may include at least one module, which implements either wired/wireless communication between one communication network including the mobile terminal 100 and the other communication network including the vehicle calling server 200 or wired/wireless communication between one communication network including the vehicle calling server 200 and the other communication network including the vehicle terminal 300. For example, the RF communication unit 210 may include a mobile communication module 211, an Internet module 212, a short range communication module 213, and the like.

The mobile communication module 211 transmits and receives an RF signal to and from at least one of a base station (BS), the mobile terminal 100, and the vehicle terminal 300.

The Internet module (or network module) 212 is used for implementing wireless Internet access, and transmits and receives the RF signal to and from either of the mobile terminal 100 and the vehicle terminal 300 over the Internet or other network. In this case, the Internet module 212 may be installed inside or outside of the vehicle calling server 200. A variety of wireless Internet technologies can be used, for example, Wireless LAN (WNAN) (Wi-Fi), Wireless broadband (WiBro), World Interoperability for Microwave Access (WiMax), High Speed Downlink Packet Access (HSDPA), and the like.

The short range communication module 213 is a module for implementing short range communication, and transmits/receives the RF signal to/from the mobile terminal 100 and the vehicle terminal 300 over a short range communication network. In this case, a variety of short range communication technologies can be used, for example, Bluetooth, Radio Frequency Identification (RFID), Infrared Data Association (IrDA), Ultra Wideband (UWB), ZigBee, and the like.

The position recognition unit 220 may recognize the current positions of the mobile terminal 100 and the vehicle terminal 300. The position recognition unit 220 recognizes information about the position of a base station (BS) connected to the mobile terminal 100 or information about the position of another base station (BS) connected to the vehicle terminal 300, such that it can recognize the current positions of the mobile terminal 100 and the vehicle terminal 300 on the basis of the received information.

The DB 230 may store one or more programs for operating the vehicle calling server 200, and may temporarily store I/O data.

The DB 230 includes a map storage unit 231, a first storage unit 232 for storing the list of mobile terminals registered for a vehicle calling service of the invention, and a second storage unit 233 for storing the list of vehicles registered in the vehicle calling service.

The map storage unit 231 stores map data indicating various regions including base stations (BSs). The vehicle calling server controller 250 searches for a map corresponding to a specific region in the above-mentioned map data, and transmits the searched map to the mobile terminal 100. Herein, the specific region includes information about the position of a base station (BS) connected to the mobile terminal 100.

Further, the vehicle calling server controller 250 searches for a map corresponding to a specific region in the above-mentioned map data, and transmits the map to the vehicle terminal 300. Herein, the specific region includes information about the position of a base station (BS) connected to the vehicle terminal 300.

As can be seen from the following Table 1, the first storage unit 232 for storing the list of service-registered mobile terminals stores authentication information of the mobile terminal 100 registered in the vehicle calling service according to the present invention.

TABLE 1

| Device information of mobile terminal | Service subscriber name | Service subscriber's phone number | Authorized service term capable of using service |
|---|---|---|---|
| 1. Tx1115 | 1. SAM | 1. 010-111-xxxx | 1. 2009.01.01~2009.03.01 |
| 2. At1133 | 2. TOM | 2. 010-222-xxxx | 2. 2009.01.01~2009.02.01 |
| 3. Xr1122 | 3. KIM | 3. 010-333-xxxx | 3. 2009.01.01~2009.05.01 |

As shown in Table 1, the first storage unit 232 for storing the list of service-registered mobile terminals may include device information acting as authentication information of the mobile terminal 100 registered in the vehicle calling service, personal information (e.g., name, and phone number, etc.) of a service subscriber registered in the vehicle calling service, an authorized service term, and the like.

As can be seen from the following Table 2, the second storage unit 233 for storing the list of service-registered vehicle terminals stores authentication information of the vehicle terminal 300 registered in the vehicle calling service according to the present invention.

TABLE 2

| Device information of vehicle terminal | Service subscriber name | Service subscriber's phone number | Authorized service term capable of using service |
|---|---|---|---|
| 1. aaa1115 | 1. KOO | 1. 010-123-xxxx | 1. 2009.01.01~2009.03.01 |
| 2. bbb2133 | 2. NICK | 2. 010-234-xxxx | 2. 2009.01.01~2009.02.01 |
| 3. xxx1122 | 3. ALICE | 3. 010-345-xxxx | 3. 2009.01.01~2009.05.01 |

As shown in Table 2, the second storage unit 233 for storing the list of service-registered vehicles may include device information acting as authentication information of the vehicle terminal 300 registered in the vehicle calling service, personal information (e.g., name, phone number, etc.) of a service subscriber registered in the vehicle calling service, an authorized service term, and the like.

In the meantime, the time/distance calculator 240 calculates the shortest distance between the mobile terminal 100 and each vehicle terminal 300 (i.e., each vehicle having a vehicle terminal 300) on the basis of the position of the mobile terminal 100, using the position of the mobile terminal 100 and the position of each vehicle terminal 300 mounted to or carried in each available vehicle (e.g., each empty or cruising vehicle), and calculates an estimated arrival time on the basis of the calculated shortest distance.

In this case, the vehicle calling server controller 250 may transmit not only information about the shortest distance from the mobile terminal 100 to each vehicle terminal 300 but also information about the estimated arrival time for each vehicle if that vehicle were to arrive at the current position of the mobile terminal 100 based on the shortest distance (or other calculated distance) between the mobile terminal 100 and each vehicle terminal 300. As a variation, traffic information can be considered in determining the estimated arrival time for each vehicle.

The vehicle calling server controller 250 generally controls overall operations of the vehicle calling server 200. Detailed operations of the vehicle calling server controller 250 will hereinafter be described in detail.

As described above, the constituent elements of the vehicle calling server 200 have been described with reference to FIG. 3.

Next, the vehicle terminal 300 mounted to or otherwise provided in the vehicle 400 will hereinafter be described in detail with reference to FIG. 4.

Figure 4:
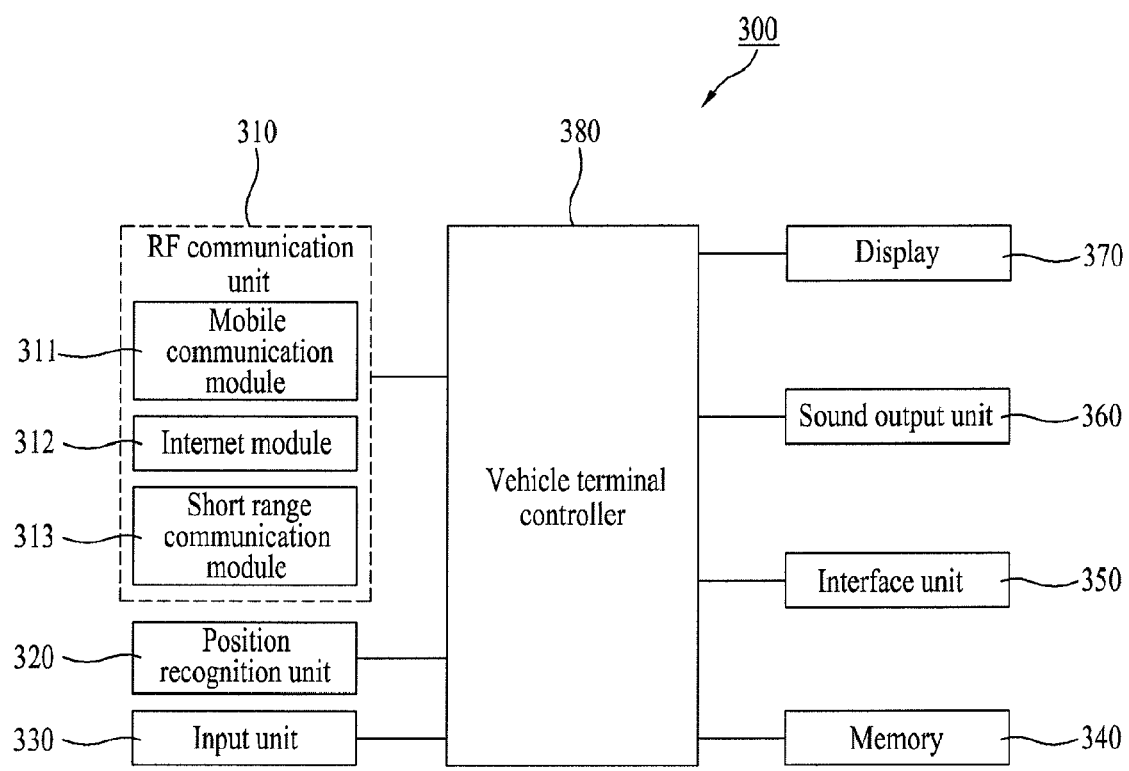
FIG. 4 is a block diagram illustrating a vehicle terminal according to an embodiment of the present invention.

FIG. 4 is a block diagram illustrating the vehicle terminal 300 according to an embodiment of the present invention.

Referring to FIG. 4, the vehicle terminal 300 may include an RF communication unit 310, a position recognition unit 320, an input unit 330, an interface unit 350, a sound output unit 360, a display 370, a vehicle terminal controller 380, and the like.

Needless to say, it is possible to implement a different vehicle terminal 300 having more or fewer constituent elements than those of FIG. 4 as necessary.

The above-mentioned constituent elements will hereinafter be described in detail.

The RF communication unit 310 may include at least one module which implements wired/wireless communication between one communication network including the vehicle terminal 300 and the other communication network including the vehicle calling server 200. For example, the RF communication unit 310 may include a mobile communication module 311, an Internet module 312, a short range communication module 313, and the like.

The mobile communication module 311 transmits and receives an RF signal to and from at least one of a base station (BS), the mobile terminal 100, other vehicle terminal in another vehicle, and the vehicle calling server 200.

The Internet or network module 312 is used for implementing wireless Internet access, and transmits and receives the RF signal to and from either of the mobile terminal 100 and the vehicle calling terminal 200 over the Internet or other network. In this case, the Internet module 312 may be installed inside or outside of the vehicle terminal 300. In addition, a variety of wireless Internet technologies can be used, for example, Wireless LAN (WNAN) (Wi-Fi), Wireless broadband (WiBro), World Interoperability for Microwave Access (WiMax), High Speed Downlink Packet Access (HSDPA), and the like.

The short range communication module 313 is a module for implementing short range communication, and transmits/receives the RF signal to/from either of the mobile terminal 100 and the vehicle calling server 200 over a short range communication network. In this case, a variety of short range communication technologies can be used, for example, Bluetooth, Radio Frequency Identification (RFID), Infrared Data Association (IrDA), Ultra Wideband (UWB), ZigBee, and the like.

The position recognition unit 320 serves as a Global Positioning System (GPS), such that it can obtain a current position of the vehicle terminal 300. The position recognition unit 320 may calculate the current location of the vehicle terminal 300 or may obtain the calculated current location of the vehicle terminal 300 from another unit or device.

The position recognition unit 320 receives data from three or more satellites, such that it calculates information about the distance from the mobile terminal to each satellite and information about accurate time information on the basis of the received data. Then, the position recognition unit 320 performs triangulation using the calculated information, such that it can correctly detect three-dimensional (or two dimensional) current position information based on latitude and longitude with or without altitude.

Presently, a method for calculating position-information and time-information of a vehicle terminal using three satellites, and correcting an error of the calculated position and time information using still another satellite has been widely used. Also, the position recognition unit 320 continuously detects a current position of the vehicle terminal in real time, such that it can calculate speed information of the vehicle terminal.

The position recognition unit 320 may also recognize the position of the vehicle terminal 300 using not only the GPS but also BS position information.

The input unit 330 generates input data for allowing a user to control operations of the vehicle terminal 300. The input unit 130 may be implemented as a key pad, a touchpad (including a static-pressure type and an electrostatic type), a jog wheel, a jog switch, and the like.

The memory 340 may store one or more programs for operating the controller 380 of the vehicle terminal, and may temporarily store input/output (I/O) data (e.g., positioning programs, moving images, and the like)

The memory 340 stores map data. The vehicle terminal controller 380 searches for a map corresponding to a region including a current position of the vehicle terminal 300 recognized by the position recognition unit 320 in the stored map data, indicates the current position of the vehicle terminal 300 on the searched map, and displays the indicated current position on the display 370. The memory 340 further can store other vehicle information, such as information about the vehicle itself (e.g., car maker, brand, year built, etc.), information about the vehicle's driver (e.g., male or female, license information, etc.). This vehicle information can be displayed on the display 370 on the map or in some other manner.

The memory 340 may include at least one of various storage units, for example, a flash memory, a hard disc, a multimedia card micro, a card type memory (e.g., SD or XD memory), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disc, and an optical disc.

The interface unit 350 is used as a path via which the vehicle terminal 300 is connected to all external devices. The interface unit 350 receives data from the external devices, or receives a power source from the external devices, such that it transmits the received data and the power source signal to each constituent element contained in the vehicle terminal 300, or transmits data stored in the vehicle terminal 300 to the external devices.

For example, the interface unit 350 may include a wired/wireless headset port, an external power-supply port, a wired Internet connection port, a wired/wireless data port, a memory card port, a USB port, an audio I/O port, a video I/O port, an earphone port, and the like.

The sound output unit 360 may output voice data for notifying a user of position information, a variety of warning sounds, or audio data.

The display 370 displays information processed by the vehicle terminal 300. For example, if it is assumed that the vehicle terminal 300 is in a vehicle calling mode, the display 370 may display a map that simultaneously includes the position of the mobile terminal 100 and the position of the vehicle terminal 300. The map further can include a display of other vehicle information associated with the vehicle 400.

The display 170 may include at least one of a liquid crystal display (LCD), a thin film transistor-liquid crystal display (TFT LCD), an organic light-emitting diode (OLED), a flexible display, and a 3D display.

If the display 370 and a touch sensor are configured in the form of a layer, namely, if the display 370 and the touch sensor are configured in the form of a touch screen, the display 370 may also be used as an input unit in addition to being used as the output unit. The touch sensor may be configured in the form of a touch film, a touch sheet, a touch pad, and the like.

The touch sensor detects the pressure applied to a specific part of the display 370 or a variation of electrostatic capacity generated from such a specific part of the display 370, and converts the detected pressure and the variation of electrostatic capacity into an electric input signal. The touch sensor may be configured to detect not only information about the position and region where the user touches, but also information about the pressure generated by the user's touching action.

The vehicle terminal controller 380 generally controls overall operations of the vehicle terminal 300. Detailed operations of the vehicle terminal controller 380 will hereinafter be described in detail.

As described above, the mobile terminal 100, the vehicle calling server 200, and the vehicle terminal 300 for implementing the vehicle calling service have been described with reference to FIGS. 2 to 4.

Figure 5:
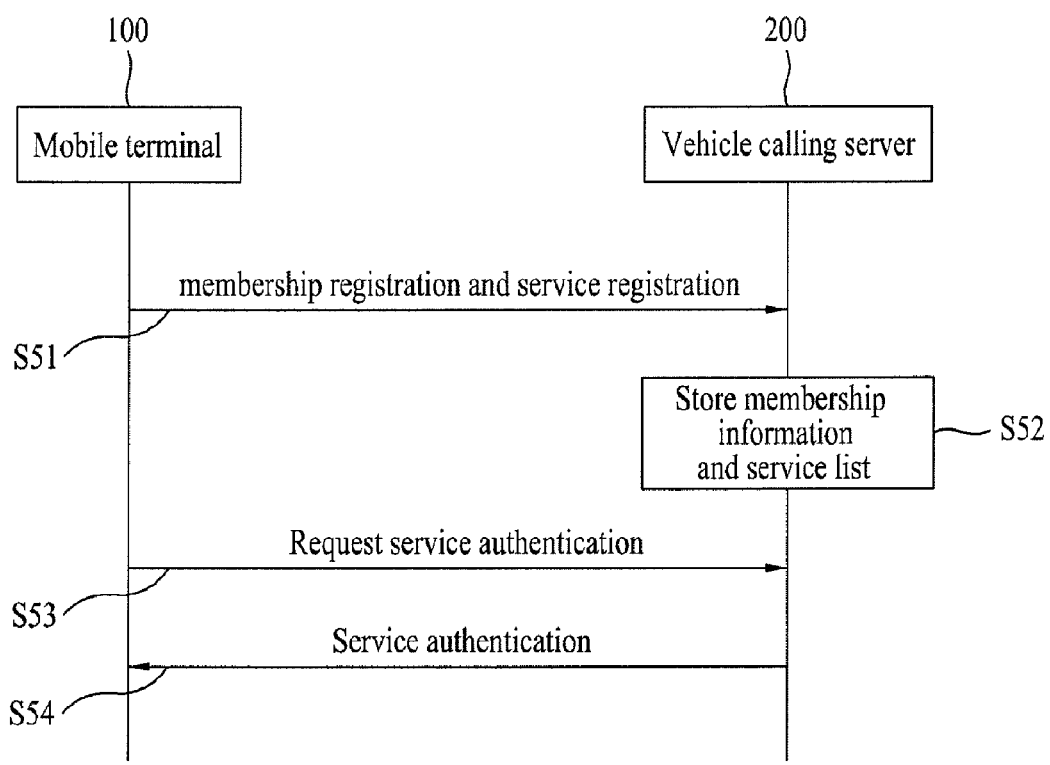
FIG. 5 is a flowchart illustrating a vehicle calling service registration procedure for use in a mobile terminal according to an embodiment of the present invention.

FIG. 5 is a flowchart illustrating a vehicle calling service registration procedure for use in a mobile terminal according to an embodiment of the present invention. The method of FIG. 5 and all other methods described herein are preferably implemented in the system of FIGS. 1-4.

Referring to FIG. 5, in order to register a mobile terminal in the vehicle calling service, the mobile terminal controller 180 gains access to the vehicle calling server 200 by controlling the RF communication unit 110, and registers membership information and the list of services (i.e., a service list) in the vehicle calling server 200 through the use of the input unit 130 at step S51. In more detail, the membership information and the service list are received through the input unit 130 from a user of the mobile terminal 100.

In this case, the membership information according to the present invention may include membership ID, password, and payment information of the user of the mobile terminal 100, and the service list may include information about a radius of a vehicle searching range and information about the number of vehicle searching times, etc.

The controller 250 of the vehicle calling server 200 stores the membership information and service list received from the mobile terminal 100 in the first storage unit 232 for storing the service-registered mobile terminals at step S52.

After that, if the user selects a menu function for activating the vehicle calling service through the use of the input unit 130, the mobile terminal controller 180 gains access to the vehicle calling server 200 by controlling the RF communication unit 110, e.g., via the network. If the user enters his or her membership ID and password for authenticating the vehicle calling service through the input unit 130, the mobile terminal controller 180 transmits a service authentication request signal including the entered membership ID and password information to the vehicle calling server 200 at step S53.

The controller 250 of the vehicle calling server compares the membership ID and password information received from the mobile terminal 100 with the other ID and password pre-stored in the first storage unit 232 storing the list of service-registered mobile terminals, and completes service authentication according to the result of comparison at step S54.

Figure 6:
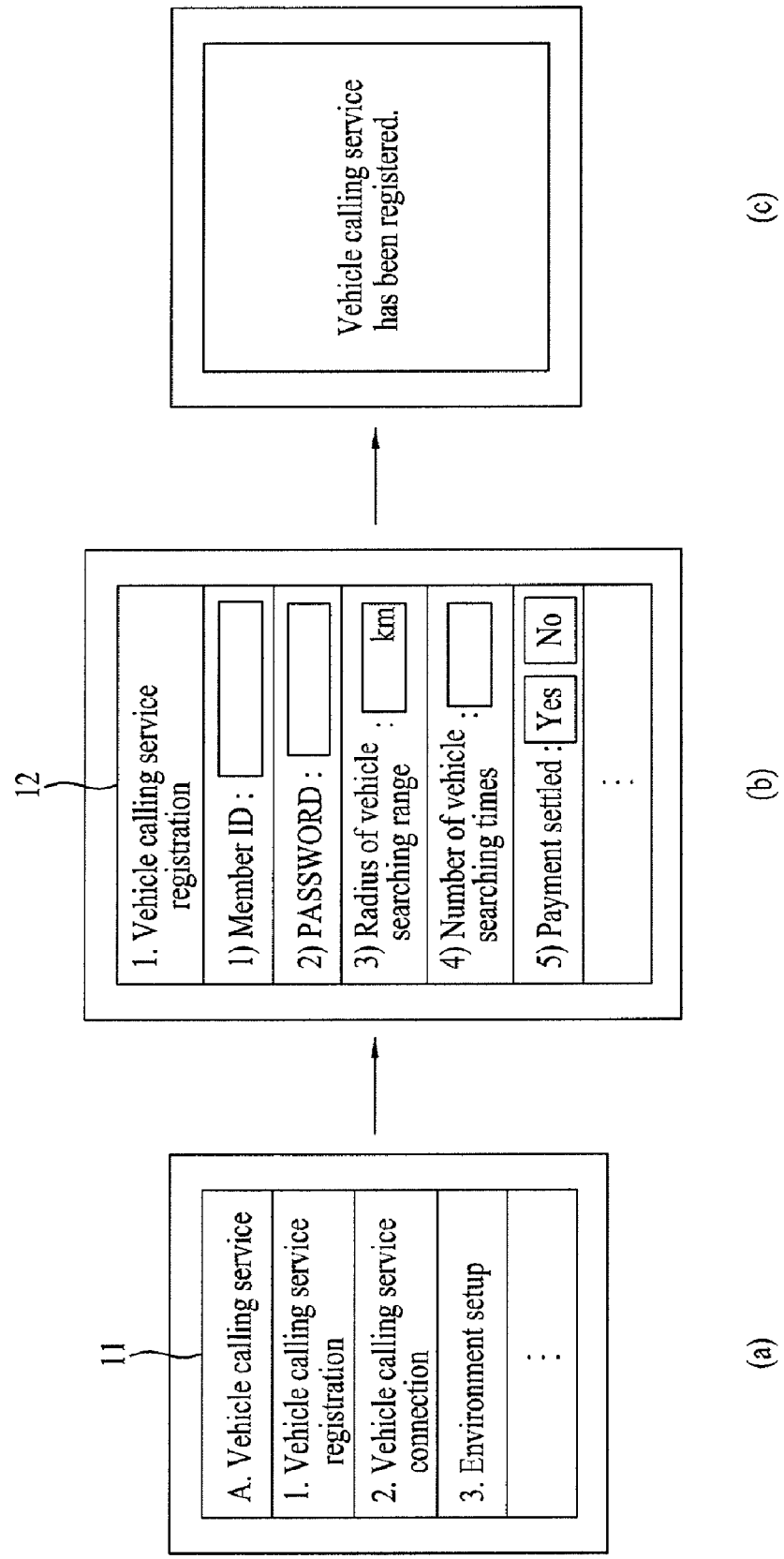
FIG. 6 is an example of a screen image illustrating a vehicle calling service registration procedure for use in a mobile terminal according to an embodiment of the present invention.

FIG. 6 is an example of a screen image illustrating a vehicle calling service registration procedure for use in a mobile terminal according to an embodiment of the present invention.

As can be seen from FIG. 6(*a*) if the user selects a menu 11 denoted by "vehicle calling service registration" among menu functions displayed on the display 170 of the mobile terminal 100, the mobile terminal controller 180 gains access to the vehicle calling server 200 through the RF communication unit 110, and displays a window 12 that illustrates the membership information and the service list received from the vehicle calling server 200, on the display screen 170 as shown in FIG. 6(*b*).

If the user enters his or her membership information and the service list through the use of the window 12 illustrating the membership information and service list shown in FIG. 6(*c*), the mobile terminal controller 180 transmits the user-entered membership information and service list to the vehicle calling server 200, and thus completes service authentication.

Figure 7:
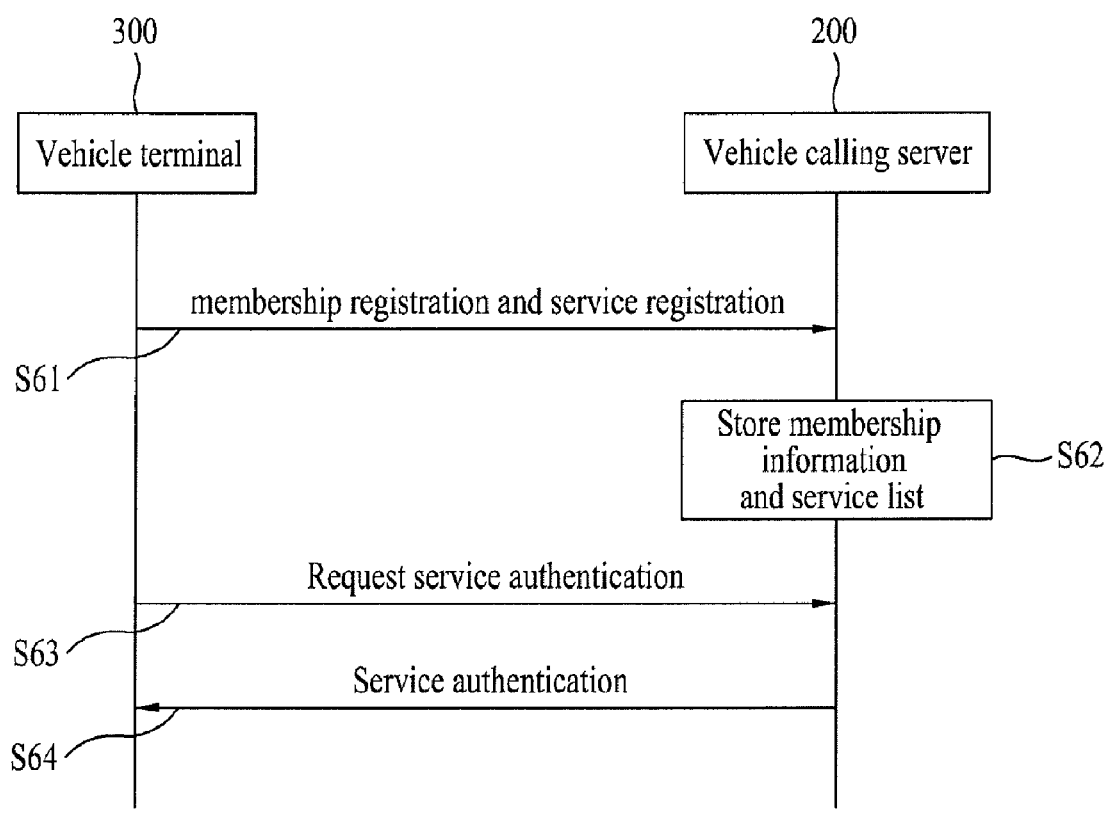
FIG. 7 is a flowchart illustrating a vehicle calling service registration procedure for use in a vehicle terminal according to an embodiment of the present invention.

FIG. 7 is a flowchart illustrating a vehicle calling service registration procedure for use in a vehicle terminal according to an embodiment of the present invention.

Referring to FIG. 7, in order to register a vehicle terminal in the vehicle calling service according to the present invention, the vehicle terminal controller 380 gains access to the vehicle calling server 200 by controlling the RF communication unit 310, and registers membership information and the service list in the vehicle calling server 200 through the use of the input unit 330 at step S61. In more detail, the membership information and the service list are received through the input unit 130 by a user (e.g., driver of the vehicle) of the vehicle terminal 300.

In this case, the membership information according to the present invention may include member ID, password, and payment information of the user of the vehicle terminal 300, and the service list may include information about a radius of a vehicle-dispatchable range, information about a vehicle-dispatchable region, and the like.

The controller 250 of the vehicle calling server 200 stores the membership information and service list received from the vehicle terminal 300 in the second storage unit 233 for storing the service-registered vehicle terminals at step S62.

After that, if the user of the vehicle terminal 300 selects a menu function for activating the vehicle calling service through the use of the input unit 330, the vehicle terminal controller 380 gains access to the vehicle calling server 200 by controlling the RF communication unit 310. If the user enters his or her membership ID and password for authenticating the vehicle calling service, the vehicle terminal controller 380 transmits a service authentication request signal including the user-entered membership ID and password information to the vehicle calling server 200 at step S63.

The controller 250 of the vehicle calling server 200 compares the membership ID and password information (e.g., information related to the vehicle, vehicle terminal and/or driver of the vehicle) received from the vehicle terminal 300 with the other ID and password pre-stored in the storage unit 232 storing the list of service-registered vehicle terminals, and completes service authentication according to the result of comparison at step S64.

Figure 8:
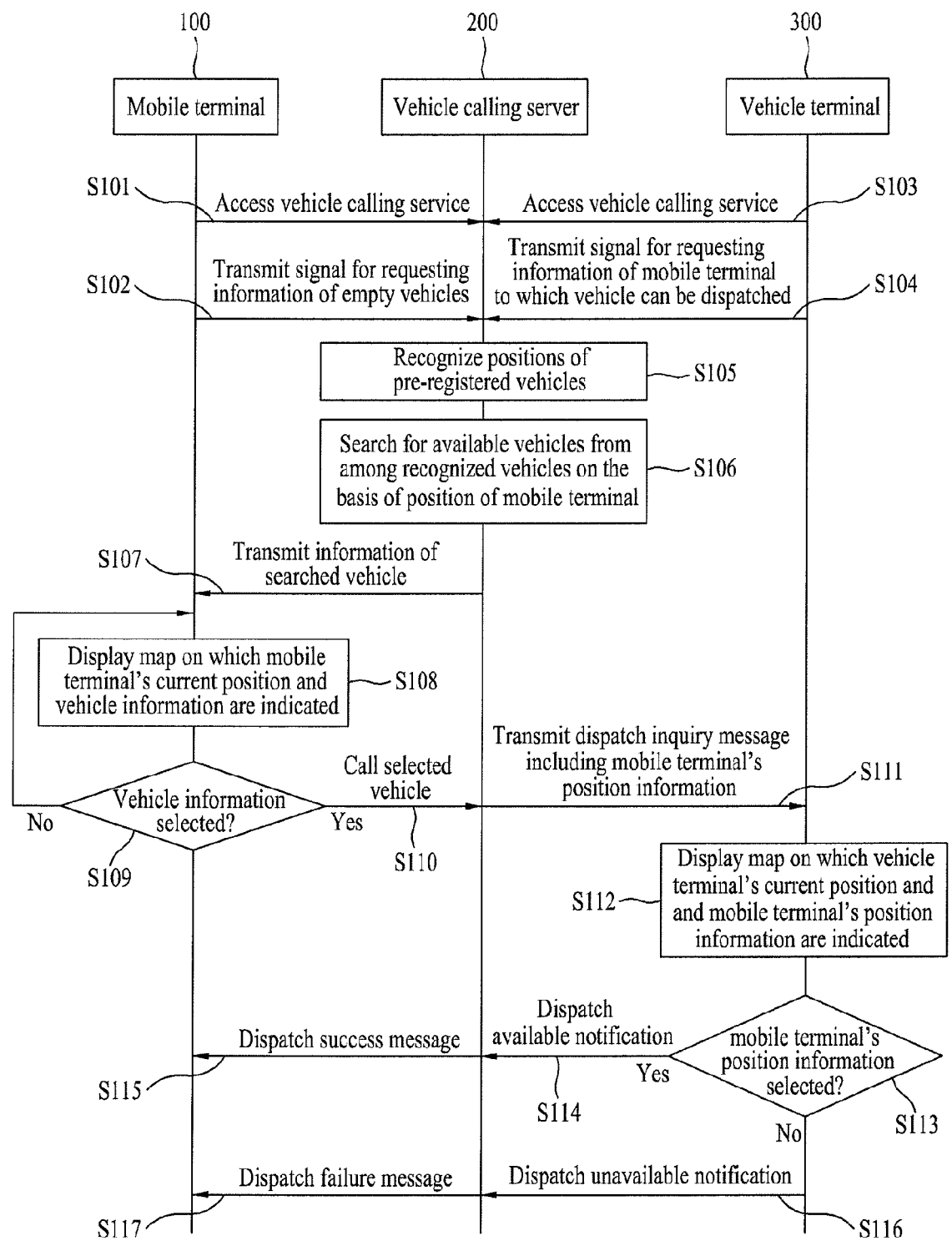
FIG. 8 is a flowchart illustrating a vehicle calling service procedure according to an embodiment of the present invention.

FIG. 8 is a flowchart illustrating a vehicle calling service procedure according to an embodiment of the present invention.

Referring to FIG. 8, if the user at the mobile terminal 100 enters a signal for accessing the vehicle calling service through the use of the input unit 130, the mobile terminal controller 180 gains access to the vehicle calling server 200 providing the vehicle calling service by controlling the RF communication unit 110 at step S101.

In this case, if a specific key to which the vehicle calling service access function is allocated is selected from among several keys included in the input unit 130, the mobile terminal controller 180 can be connected to the vehicle calling server 200, e.g., via the network. For example, the mobile terminal controller 180 may also be connected to the vehicle calling server 200 even when a specific menu for accessing the vehicle calling service is selected from among several menu functions.

Under the condition that the mobile terminal controller 180 is connected to the vehicle calling server 200, if the user at the mobile terminal 100 enters a command for searching for available vehicles (e.g., its seats are empty, ready for service, etc) located within a predetermined distance from the current position of the user's mobile terminal 100 through the use of the input unit 130, the mobile terminal controller 180 transmits a request signal for requesting information about the available vehicles located within the predetermined distance from the current position of the mobile terminal 100 to the vehicle calling server 200 at step S102. Here, all available vehicles within the predetermined distance from the current position of the mobile terminal 100 may be requested or certain available vehicles that fit only certain criteria (which may be set by the user, e.g., vehicles driven by female drivers only) within the predetermined distance from the current location of the mobile terminal 100 may be requested by the user. This can be variably set by the user of the mobile terminal 100 or by the service policy or the vehicle calling server 200 or any combination thereof.

In this case, the mobile terminal controller 180 obtains the current position of the mobile terminal 100 by controlling the position recognition unit 120, includes the obtained position information in the request signal, and transmits the request signal including the obtained position information to the vehicle calling server 200.

The vehicle calling server 200 itself can also determine the current position/location of the mobile terminal 100 on the basis of the base station (BS) position information. However, if communication between the vehicle calling server 200 and the base station (BS) is severed due to the occurrence of communication errors, the vehicle calling server 200 may be unable to obtain the position of the mobile terminal 100. In order to obviate such problems, the position information of the mobile terminal 100 (e.g., general position information or exact position information of the mobile terminal 100) is transferred to the vehicle calling server 200. If the vehicle calling server 200 itself can obtain the current position of the mobile terminal 100, then this step of transmitting the current position of the mobile terminal 100 from the mobile terminal 100 to the server 200 may be omitted or optional.

In the meantime, if the user of the vehicle terminal 300 enters a signal for accessing the vehicle calling service through the use of the input unit 330, the vehicle terminal controller 380 controls the RF communication unit 310 such that it is connected to the vehicle calling server 200, e.g., via the network, for providing the vehicle calling service at step S103. Step S103 can occur independent from step S101.

Under the condition that the vehicle terminal controller 380 is connected to the vehicle calling server 200, if the user (e.g., driver of the vehicle 400) of the vehicle terminal 300 enters a command to search for the mobile terminals such as the mobile terminal 100 (hereinafter referred to as the available mobile terminal 100 for convenience of description) currently located in a region into which the vehicle 400 can quickly move to, the vehicle terminal controller 380 controls the RF communication unit 310 such that it transmits a request signal for requesting information about the searched mobile terminal 100 to the vehicle calling server 200 at step S104.

In this case, for example, the vehicle terminal controller 380 controls the position recognition unit 320 to obtain a current position of the vehicle terminal 300, includes the obtained position information in the request signal, and transmits the request signal including the obtained position information to the vehicle calling server 200. In this manner, the vehicle calling server 200 may obtain current position information of each of available vehicles among the pre-registered vehicles, and this current information may be continuously or real time updated in the vehicle calling server 200.

Here the vehicle calling server 200 can determine the current position of the vehicle terminal 300 on the basis of the base station (BS) position information. However, if communication between the vehicle calling server 200 and the base station (BS) is severed due to the occurrence of communication errors, the vehicle calling server 200 may be unable to determine the current position of the vehicle terminal 300. In order to obviate this problem, the current position information of the vehicle terminal 300 may be optionally transferred from the vehicle terminal 300 to the vehicle calling server 200.

In the meantime, upon receiving the request signal of the above step S102 from the mobile terminal 100, the vehicle calling server controller 250 recognizes the current positions of service-registered vehicles stored in the storage unit 233 which stores the list of service-registered vehicles, at step S105.

In this case, for example, the vehicle calling server controller 250 can control the position recognition unit 220 to recognize the position of a base station (BS) connected to the service-registered vehicles stored in the storage unit 233, and can recognize the current positions of service-registered vehicles stored in the storage unit 233 using the recognized BS position information.

After that, the vehicle calling server controller 250 recognizes the current position of the mobile terminal 100, and searches for the positions of some or all available vehicles located close to (i.e., within a predetermined distance from) the current position of the mobile terminal 100 among the current vehicle positions (that have been recognized at step S105) of the pre-registered vehicles, at step S106.

In this case, for example, the vehicle calling server controller 250 recognizes the position of a base station connected to the mobile terminal 100 through the position recognition unit 220, such that it can recognize the current position of the mobile terminal 100. In addition or in the alternative, the vehicle calling server controller 250 can also recognize the current position of the mobile terminal 100 by referring to the mobile terminal 100's position information contained in the request signal having been received from the mobile terminal 100 at step S102.

The vehicle calling server controller 250 can search for available vehicles that are close to the mobile terminal 100's position shown in step S106, e.g. by referring to the radius of the vehicle searching range established by the mobile terminal 100 as shown in FIG. 6(b). For convenience of description, the radius of the vehicle searching range will hereinafter be referred to as a vehicle searching radius.

For example, if the vehicle searching radius shown in FIG. 6(b) is set to 5 km from the current position of the mobile terminal 100, the vehicle calling server controller 250 may search for available vehicles that are located within the radius of 5 km on the basis of the position of the mobile terminal 100 among all vehicles searched at step S106.

Subsequently, the vehicle calling server controller 250 controls the time/distance calculator 240 to calculate not only the shortest distance between the mobile terminal 100 and each of the searched vehicles of step S106 but also the estimated arrival time, and transmits vehicle information including this information for each available searched vehicle to the mobile terminal 100 at step S107. Herein, the vehicle information can include, but is not limited to, types, current locations, vehicle license plate numbers of the searched vehicles, phone numbers of drivers of the searched vehicles, detailed information of the drivers, the calculated shortest distance, and the estimated arrival time to the mobile terminal 100, etc. In this case, the vehicle types contained in the vehicle information may indicate taxis of individual regions (e.g., taxis in Seoul or taxis in another city or region such as Kyoungki-do). The detailed information of each vehicle driver may include sex, driving history, vehicle accident history, available languages and the like of the driver.

In this case, the vehicle calling server controller 250 searches for a map that indicates a region including the positions of the searched vehicles among data stored in the map storage unit 231, indicates the current position of the mobile terminal 100 (requesting the service) on the map, indicates the vehicle information at or near the current position of each of the searched vehicles, and then provides the mobile terminal 100 with the resultant map on which the current position of the mobile terminal 100 and the vehicle information are indicated, at steps S107 and S108.

If the mobile terminal controller 180 receives information about the available vehicles based on the mobile terminal 100's current position from the vehicle calling server 200, it recognizes the position information of the available vehicles in the current region where the mobile terminal 100 is located.

At step S107, the server 200 may or may not send the map including an indication of the current position of the mobile terminal 100 when it sends the vehicle information to the mobile terminal 100. If such information is not received, the mobile terminal controller 180 searches for a map corresponding to the current region in the map data stored in the memory 140, indicates the current position of the mobile terminal 100 on the searched map, and indicates the received vehicle information at the positions of the searched vehicles on the same map, and displays the resultant map on the display 170 at step S108.

In this case, if the map indicating the received vehicle positions is not present in the map data stored in the memory 140, the mobile terminal controller 180 may receive a different map indicating both the mobile terminal 100's position and the vehicle information from the vehicle calling server 200 as described above.

The mobile terminal controller 180 can analyze the distance between the mobile terminal 100 and each available vehicle, and an estimated arrival time of each available vehicle on the basis of the received vehicle information, sequentially indicates the analyzed distance information on the map in an ascending (or descending) numerical order, and sequentially indicates the analyzed arrival time information on the map in an ascending (or descending) numerical order.

After that, if any one of the vehicle information (e.g., particular vehicle) indicated on the map is selected through the input unit 130 or the display 170 configured in the form of a touch screen at step S109, the mobile terminal controller 180 provides the vehicle calling server 200 with a request signal for dispatching a vehicle corresponding to the selected vehicle information at step S110.

In this case, for example, if any one of the vehicle information indicated on the map displayed on the mobile terminal 100 is double-clicked or double-touched through the input unit 130 or the touch screen 170, then the mobile terminal controller 180 may recognize that the double-clicked or double-touched vehicle information has been selected.

In addition, for example, if any one of the vehicle information indicated on the map is long-clicked (e.g., the clicked status is maintained for a predetermined time) or long-touched (e.g., the touched status is maintained for a predetermined time), the mobile terminal controller 180 may recognize that the long-clicked or long-touched vehicle information has been selected.

In another example, if any one of the vehicle information indicated on the map is dragged and dropped onto the position of the mobile terminal 100 displayed on the map through the input unit 130 or the touch screen 170, or if information about the position of the mobile terminal 100 is dragged and dropped onto any one of the vehicle information on the displayed, this means that the vehicle information corresponding to the dropped position has been selected.

In the meantime, the mobile terminal controller 180 includes the selected vehicle information in the request signal of step S110, and transmits the resultant request signal including the selected vehicle information to the vehicle calling server 200, such that the vehicle calling server 200 can identify the vehicle selected by the mobile terminal 100 (which may be below referred to as the called vehicle or requested vehicle). The mobile terminal controller 180 includes detailed information (e.g., vehicle license place number, driver's phone number, etc.) of the requested vehicle in the request signal of step S110, and transmits the detailed information to the vehicle calling server 200, such that the vehicle calling server 200 can easily identify the requested vehicle.

Meanwhile, as another variation, if any one of the vehicle information indicated on the map displayed on the mobile terminal 100 is selected, the mobile terminal controller 180 may directly transmit a vehicle calling message corresponding to the selected vehicle information to the vehicle terminal 300 without passing through the vehicle calling server 200.

In other words, since the selected vehicle information includes a phone number of the selected vehicle's driver, the user of the mobile terminal 100 may transmit a vehicle calling message to the vehicle terminal 300 directly using the phone number information contained in the above vehicle information. In this case, the vehicle calling message may be configured in the form of any one of a voice/image call signal, an SMS/MMS message, and an E-mail, etc.). For instance, the mobile terminal 100 may send a text message directly to the selected vehicle terminal 300 regarding the dispatch of the corresponding vehicle 400 to the current location of the mobile terminal 100.

At step S110, upon receiving the vehicle calling request signal from the mobile terminal 100, the vehicle calling server controller 250 analyzes the vehicle information contained in the vehicle calling request signal. The vehicle calling server 250 may search for vehicle(s) corresponding to the analyzed vehicle information in the storage unit 233 which stores the list of service-registered vehicles.

Subsequently, the vehicle calling server controller 250 transmits an inquiry signal including the position information of the mobile terminal 100 to the called vehicle (or the searched vehicle) so as to inquire of the called vehicle's driver about whether the called vehicle can travel to the mobile terminal 100, at step S111.

In this case, for example, the vehicle calling server controller 250 searches for a map, on which the current position of the mobile terminal 100 and the current positions of the searched vehicles are indicated, among data stored in the map storage unit 231, indicates the current position of the mobile terminal 100 on the searched map, indicates the vehicle information at the current positions of the searched vehicles on the map, and finally transmits the resultant map including the mobile terminal 100's position and the vehicle information to the vehicle terminal 300.

Further, the vehicle calling server controller 250 may provide the vehicle terminal 300 with information on the shortest path between the vehicle terminal and the mobile terminal 100.

Upon receiving the above-mentioned inquiry signal including the current position information of the mobile terminal 100 from the vehicle calling server 200 at step S111, the vehicle terminal controller 380 searches for a map corresponding to a current region among map data stored in the memory 340, indicates the current position of the mobile terminal 100 and the current position of the vehicle terminal 300 on the searched map, and displays the indicated positions on the display 370, at step S112.

In this case, for example, if the map indicating the received vehicle positions is not available in the map data stored in the memory 340, the vehicle terminal controller 380 may receive a different map indicating the position of the mobile terminal 100 from the vehicle calling server 200 as described above.

On the other hand, if the mobile terminal 100's position information indicated on the map is selected through the input unit 330 or the display 370 configured in a touch-screen type within a predetermined period of time at step S113, the vehicle terminal controller 380 transmits a response signal in response to the inquiry signal to the vehicle calling server 200 so as to notify the vehicle calling server 200 that the corresponding vehicle can be dispatched and/or has dispatched to the mobile terminal 100 (i.e., a dispatch-available status) at step S114. Thereafter, the vehicle calling server 200 can send a command the driver of the response vehicle to move to the position of the mobile terminal 100 or the driver of the vehicle 400 may move towards the location of the mobile terminal 100 immediately after the mobile terminal 100's position is selected.

At step S113, for example, if the mobile terminal 100's position information indicated on the map displayed on the vehicle terminal 300 is double-clicked or double-touched through the input unit 330 or the touch screen 370, then the vehicle terminal controller 380 may recognize that the mobile terminal 100 corresponding to the double-clicked or double-touched position information has been selected.

In addition or as a variation, if the mobile terminal 100's position information indicated on the map displayed on the vehicle terminal 300 is long-clicked (e.g., the clicked status is maintained for a predetermined time) or long-touched (e.g., the touched status is maintained for a predetermined time), the vehicle terminal controller 380 may recognize that the mobile terminal 100 corresponding to the long-clicked or long-touched vehicle information has been selected.

In another example, if the mobile terminal 100's position information indicated on the map displayed on the vehicle terminal 300 is dragged and dropped onto the position of the vehicle terminal 300 through the input unit 330 or the touch screen 370, or if information about the position of the vehicle terminal 300 is dragged and dropped onto the position information of the mobile terminal 100 displayed on the map, this means that the mobile terminal 100 corresponding to the dropped position has been selected.

Upon receiving the signal indicating a dispatch-available status (e.g., indicating that the dispatch has begun) from the vehicle terminal 300 at step S114, the vehicle calling server controller 250 provides the mobile terminal 100 with a dispatch success signal for indicating the successful dispatch of the called vehicle, at step S115. The user at the mobile terminal 100 receiving the dispatch success signal can then know that the called vehicle 400 is moving toward the current location of the user at the mobile terminal 100. In this regard, the display of the mobile terminal 100 can continuously or real time display the movement of the called vehicle on the map displayed on the mobile terminal 100 so that the user can know the dispatch status of the called vehicle. Further, information such as the expected arrival time of the called vehicle may be continuously or real time updated and displayed on the mobile terminal 100. Moreover, the user can send any text message or other information to the driver of the called vehicle, e.g., information to negotiate the fare, information about the destination/location that the user of the mobile terminal 100 wishes to go to via the called vehicle 400, etc.

Upon receiving the dispatch success signal related to the called vehicle from the vehicle calling server 200, the mobile terminal controller 180 may display image or text data indicating the successful dispatch status of the called vehicle on the map or another area displayed on the mobile terminal 100, at step S108.

In addition, upon receiving the dispatch success signal related to the called vehicle from the vehicle calling server 200, the mobile terminal controller 180 may differently display vehicle information corresponding to the successfully-dispatched vehicle such that the displayed vehicle information can be easily distinguished from other vehicle information.

In addition or as alternative, upon receiving the dispatch success signal related to the called vehicle from the vehicle calling server 200, the mobile terminal controller 180 may control the sound output unit 160 to output a sound signal for indicating the successful dispatch status of the called vehicle.

In the meantime, if the mobile terminal 100 (e.g., displayed position of the mobile terminal 100) is not selected through the input unit or the touch screen 370 for a predetermined time (e.g., the drive has made no input/response to the dispatch request) or the driver of the called vehicle has declined the dispatch request and has indicated this via the input unit or the touch screen 370 at step S113, the vehicle terminal controller 380 determines that the user/driver of the called vehicle does not desire to be dispatched to the mobile terminal 100, so that it provides the vehicle calling server 200 with a signal indicating a dispatch-unavailable status at step S116.

Upon receiving the signal indicating the dispatch-unavailable status from the vehicle terminal 300 at step S116, the vehicle calling server controller 250 provides the mobile terminal 100 with a dispatch failure signal indicating dispatch failure of the called vehicle at step S117.

Upon receiving the dispatch failure signal related to the called vehicle from the vehicle calling server 200, the mobile terminal controller 180 may display image or text data indicating the dispatch failure status of the called vehicle on the map or another area displayed on the mobile terminal 100.

In addition, upon receiving the dispatch failure signal related to the called vehicle from the vehicle calling server 200, the mobile terminal controller 180 may not display vehicle information corresponding to the dispatch-failed vehicle on the map.

In addition or as an alternative, upon receiving the dispatch failure signal related to the called vehicle from the vehicle calling server 200, the mobile terminal controller 180 may control the sound output unit 160 to output a sound signal indicating the dispatch failure status of the called vehicle.

Further, upon receiving the dispatch failure signal regarding the called vehicle at step S117, the method can return to step S102 so that the user at the mobile terminal 100 can attempt to find and request another vehicle, if the user desires.

A method for performing a vehicle calling service according to an embodiment of the present invention will hereinafter be described with reference to FIGS. 9 to 11.

Figure 9:
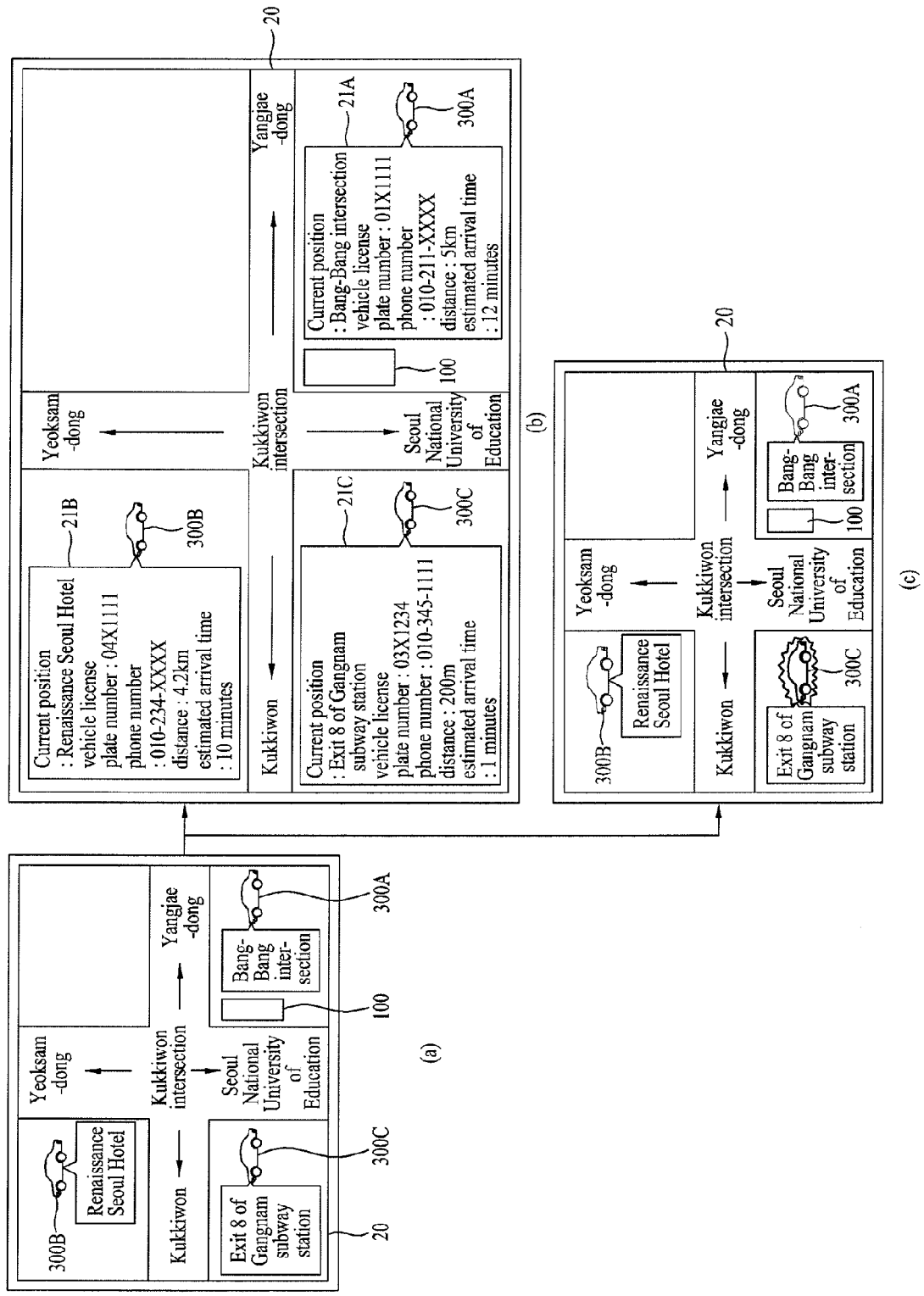
FIGS. 9 to 11 are examples of screen images illustrating a vehicle calling service procedure according to an embodiment of the present invention.
Figure 10:
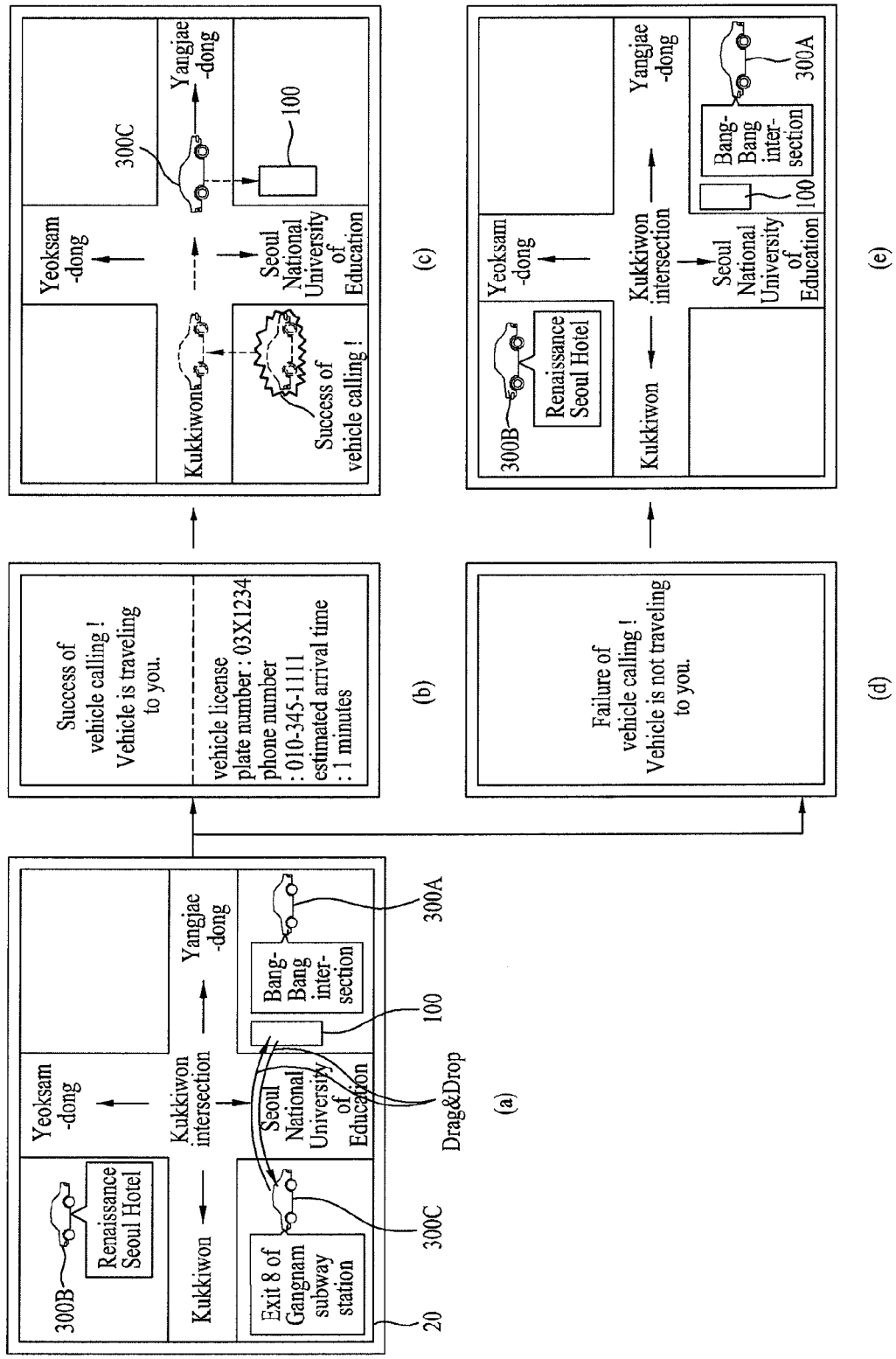
Figure 11:
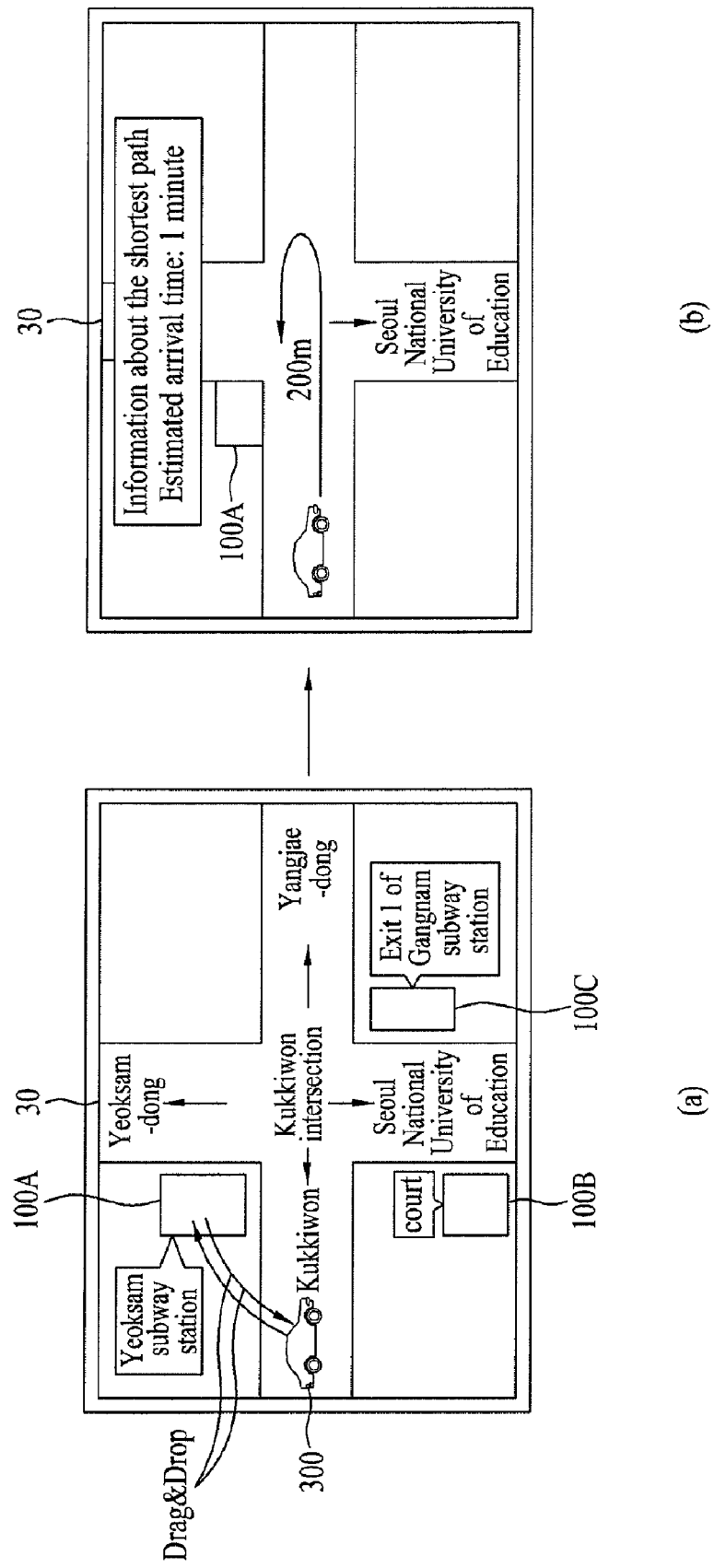

FIGS. 9 to 11 are examples of screen images illustrating a vehicle calling service procedure according to the present invention.

Referring to FIG. 9(a), at step S108 of FIG. 8, first to third user interface (UI) objects 300A, 300B, and 300C, indicating available vehicles located within a predetermined distance from the current position of the mobile terminal 100, are indicated onto parts corresponding to current positions of the available vehicles on the map 20 displayed on the mobile terminal 100, and a fourth UI object 100 indicating the mobile terminal 100 is indicated onto a part corresponding to the mobile terminal 100's position on the map 20.

FIG. 9(b) illustrates first to third vehicle information parts 21A, 21B, and 21C respectively mapped to the first to third UI objects 300A, 300B, and 300C as displayed on the map 20.

For example, if the first to third UI objects 300A, 300B, and 300C are selected through the input unit 130 or the touch screen 170, the mobile terminal controller 180 may display the first to third vehicle information parts 21A, 21B, and 21C received from the vehicle calling server on the map 20.

FIG. 9(c) illustrates that the first to third vehicle information parts 21A, 21B, and 21C are displayed to be distinguished from each other in ascending numerical order of the distance- and estimated arrival time-information related to the UI object 100 indicating the mobile terminal.

The user of the mobile terminal 100 views the map 20 shown in FIG. 9(c), such that he or she can recognize an optimum vehicle which has the shortest distance and the shortest arrival time on the basis of the current position of the mobile terminal 100.

In this case, the first to third vehicles shown in FIG. 9(c) are displayed with different brightnesses on the basis of the distance- and/or estimated arrival time-information related to the mobile terminal 100 indicating the mobile terminal. For example, the best vehicle, which has the shortest distance and the shortest estimated arrival time on the basis of the current position of the mobile terminal, may be displayed with the highest brightness, and the worst vehicle may be displayed with the lowest brightness. However, the above-mentioned method for displaying the first to third vehicles are disclosed only for illustrative purposes, and the scope and spirit of the present invention are not limited thereto.

For example, the first to third UI objects 300A, 300B, and 300C respectively corresponding to the first to third vehicles can be displayed with different colors or sizes, such that they can be distinguished from each other on the basis of the distance- and/or estimated arrival time-information related to the mobile terminal 100.

Referring to FIG. 10(a), at step S108 of FIG. 8, first to third user interface (UI) objects 300A, 300B, and 300C, indicating available vehicles located within a predetermined distance from the current position of the mobile terminal 100, are indicated onto parts corresponding to positions of the available vehicles on the map 20 displayed on the mobile terminal 100, and a fourth UI object 100 indicating the mobile terminal 100 is indicated onto a part corresponding to the mobile terminal 100's position on the map 20.

As shown in FIG. 10(a), if the third UI object 300C is dragged and dropped onto the position of the fourth UI object 100 within a predetermined time, or if the fourth UI object 100 is dragged and dropped onto the position of the third UI object 300C within the predetermined time, the mobile terminal controller 180 transmits a message for calling the third vehicle 300C (i.e., requesting the dispatch of the third vehicle) to the vehicle calling server 200.

Upon receiving a signal indicating the successful dispatch from the third vehicle corresponding to the third UI object 300C from the vehicle calling server 200, the mobile terminal controller 180 displays a message indicating the successful dispatch and vehicle information 21C of the successfully-dispatched vehicle 300C as shown in FIG. 10(b).

Then, if the mobile terminal controller 180 receives position information of the called vehicle 300C from the vehicle calling server 200 at intervals of a predetermined time, it displays the position information of the called vehicle 300C on the map 20 as the called vehicle 300C towards the mobile terminal 100 as shown in FIG. 10(c), such that the user of the mobile terminal can recognize how close the third vehicle 300C is to the position of his or her mobile terminal 100.

In the meantime, if the mobile terminal controller 180 receives a signal indicating a dispatch failure from the third vehicle 300C through the vehicle calling server 200, a message indicating the dispatch failure is displayed as shown in FIG. 10(d).

Subsequently, as shown in FIG. 10(d), the mobile terminal controller 180 may stop displaying the third UI object 300C corresponding to the dispatch-failed vehicle on the map 20.

Referring to FIG. 11(a), first to third UI objects 100A, 100B and 100C respectively corresponding to first to third mobile terminals determined to be dispatch-available mobile terminals (or mobile terminals at which their users are requesting a dispatch of a vehicle for a service) on the basis of the current position of the vehicle terminal 300, are displayed onto parts corresponding to the respective positions of the first to third mobile terminals on the map 30 displayed on the vehicle terminal 300, and the fourth UI object 300 indicating the vehicle terminal 300 is displayed onto the position of the vehicle terminal 300 on the map 30 displayed on the vehicle terminal 300.

As shown in FIG. 11(a), if the first UI object 100A is dragged and dropped onto the position of the fourth UI object 300 within a predetermined time, or if the fourth UI object 300 is dragged and dropped onto the position of the first UI object 100A within the predetermined time on the map 30 by the user of the vehicle terminal 300, the vehicle terminal controller 380 informs the first mobile terminal of the dispatch available status through the vehicle calling server 200.

In this case, the vehicle calling server 200 may provide the vehicle terminal 300 with information of the optimum shortest path between the vehicle terminal 300 and the first mobile terminal. As shown in FIG. 11(b), the vehicle terminal 300 may move to the position of the first mobile terminal using the shortest path information provided from the vehicle calling server 200.

As described above, the above-mentioned embodiments of the present invention may be implemented as a computer-readable code stored in a recording medium including a program. The computer-readable recording medium may include all kinds of recording devices, each of which stores data readable by a computer system. For example, the computer-readable recording medium may be a ROM, a RAM, a CD-ROM, a magnetic tape, a floppy disc, an optical-data storage unit, or the like. For another example, the computer-readable storage medium may also be implemented in the form of carrier waves (e.g., data transmission over the Internet). In addition, here the computer may include the mobile terminal controller 180, the vehicle calling server controller 250, and/or the vehicle calling controller 380.

Various examples of the vehicle calling method and the mobile terminal thereof have been disclosed only for illustrative purposes, and the scope and spirit of the present invention are not limited thereto. In order to implement a variety of modifications, all or some parts of the aforementioned embodiments may be selectively combined with each other.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of requesting a vehicle, the method comprising:

requesting vehicle information on each of at least one vehicle, which is located within a predetermined distance from a position of a mobile terminal and is available, to a vehicle calling server;

receiving the requested vehicle information from the vehicle calling server;

displaying, on a screen of the mobile terminal, a map on which the position of the mobile terminal and the vehicle information are indicated;

when certain vehicle information is selected from the displayed map, generating by the mobile terminal a vehicle request for requesting a dispatch of a vehicle corresponding to the selected vehicle information;

transmitting by the mobile terminal the vehicle request to the vehicle calling server;

receiving information indicating a successful dispatch result of the requested vehicle;

displaying the received information indicating the successful dispatch result of the requested vehicle on the map; and removing a display of an unsuccessfully-dispatched vehicle from the map if the requested vehicle is unsuccessfully dispatched to the mobile terminal.

2. The method of claim 1, wherein the requesting step includes:

entering, via an input unit of the mobile terminal, a command for searching for a position of at least one available vehicle on the basis of the position of the mobile terminal.

3. The method of claim 1, wherein the map is pre-stored in a storage unit of the mobile terminal, or is received by the mobile terminal from the vehicle calling server.

4. The method of claim 1, wherein the vehicle information includes at least one of the following:
- a type of a vehicle,
- a position of a vehicle,
- a phone number of a driver of a vehicle,
- contact information of a vehicle,
- information on a vehicle's driver,
- a shortest distance from the mobile terminal to a vehicle,
- an estimated arrival time of a vehicle, or
- a license plate information of a vehicle.

5. The method of claim 4, wherein the step of displaying the map includes:

displaying a plurality of vehicle information parts corresponding respectively to a plurality of vehicles among the at least one vehicle on the screen of the mobile terminal, wherein the vehicle information parts are displayed to be distinguished from each other in an ascending numerical order of either the shortest distance or the estimated arrival time in association with the corresponding vehicle.

6. The method of claim 1, wherein the step of displaying the map includes:

marking a first User Interface (UI) object serving as the mobile terminal on a specific part of the map corresponding to the mobile terminal's position on the map; and marking a second UI object serving as a vehicle on a specific part of the map corresponding to said vehicle's position on the map.

7. The method of claim 6, wherein the generating step includes:

requesting a dispatch of said vehicle, when the first UI object is dragged and dropped onto the second UI object or the second UI object is dragged and dropped onto the first UI object.

8. The method of claim 1, wherein the generating step includes:

transmitting a vehicle calling request signal including the mobile terminal's information to the vehicle calling server.

9. The method of claim 1, wherein the generating step includes:

transmitting any one of a voice/image call signal, a message, and an E-mail, that is used to contact the vehicle, which is located within the predetermined distance and is available for dispatch.

10. The method of claim 1, wherein the step of displaying the received information includes:

displaying, if the requested vehicle is successfully dispatched to the mobile terminal, information of the successfully-dispatched vehicle to be distinguished from information of another vehicle.

11. A method of requesting a dispatch of a vehicle, the method comprising:

receiving, by a vehicle terminal in a vehicle, a dispatch inquiry including position information of a mobile terminal;

displaying, on a screen provided in the vehicle terminal, a map on which position information of the vehicle terminal and the position information of the mobile terminal are indicated, wherein the displaying step further includes:

displaying a first User Interface (UI) object serving as the vehicle terminal at a specific part corresponding to the vehicle terminal's position on the map, and displaying a second User Interface (UI) object serving as the mobile terminal at a specific part corresponding to the mobile terminal's position on the map; and informing the mobile terminal of a successful dispatch status of the vehicle, when the first UI object is dragged and dropped onto the second UI object or the second UI object is dragged and dropped onto the first UI object.

12. The method of claim 11, wherein the informing step further informs the mobile terminal when an unsuccessful dispatch of the vehicle occurs.

13. The method of claim 11, wherein the receiving step receives the dispatch inquiry including the position information of the mobile terminal, through a vehicle calling server.

14. The method of claim 11, further comprising:

receiving, by the vehicle terminal, information on an optimum path between the vehicle terminal and the mobile terminal.

15. The method of claim 14, wherein the optimum path a shortest path.

16. The method of claim 14, further comprising:

displaying, on the screen of the vehicle terminal, the received information on the optimum path between the vehicle terminal and the mobile terminal.

* * * * *